United States Patent [19]
Takagi et al.

[11] 3,856,882
[45] Dec. 24, 1974

[54] PROCESS FOR PRODUCING 2,5-DIMETHYL 2,4-HEXADIENE

[75] Inventors: Kazumi Takagi; Masahiro Murakami; Kuniyoshi Manabe, all of Niihama, Japan

[73] Assignee: Sumitomo Chemical Company, Limited, Osaka, Japan

[22] Filed: Sept. 5, 1972

[21] Appl. No.: 286,300

[30] Foreign Application Priority Data
Sept. 6, 1971  Japan.............................. 46-69114
Dec. 29, 1971  Japan.............................. 46-3184

[52] U.S. Cl. .............................................. 260/681
[51] Int. Cl. ........................................... C07c 11/12
[58] Field of Search ................................. 260/681

[56] References Cited
UNITED STATES PATENTS

| 2,297,424 | 9/1942 | Maximoff et al. | 260/681 |
| 2,350,485 | 6/1944 | Arundale et al. | 260/681 |
| 2,853,535 | 9/1958 | Friedman et al. | 260/681 |
| 3,692,743 | 9/1972 | Thompson | 260/681 |

OTHER PUBLICATIONS

Sussman, Ind. & Eng. Chem., 38, p. 1230, (1946).

Primary Examiner—Delbert E. Gantz
Assistant Examiner—Veronica O'Keefe
Attorney, Agent, or Firm—Wenderoth, Lind & Ponack

[57] ABSTRACT

Process for producing 2,5-dimethyl-2,4-hexadiene by reacting isobutylene, tertiary butanol or a mixture thereof with isobutyl aldehyde in liquid phase under pressure at 110°–200°C in the presence of a catalyst, for example, a mineral acid.

10 Claims, No Drawings

PROCESS FOR PRODUCING 2,5-DIMETHYL 2,4-HEXADIENE

This invention relates to a process for producing 2,5-dimethyl-2,4-hexadiene from isobutylene and/or tertiary butanol and isobutyl aldehyde.

2,5-dimethyl-2,4-hexadiene is known to be useful as an intermediate for producing agricultural chemicals, insecticides or various other organic chemicals.

It is known to product 2,5-dimethyl-2,4-hexadiene by a general process wherein acetone and acetylene are subjected to condensation reaction to produce octine diol, which is then hydrogenated in the presence of a catalyst so as to convert it into octane diol, which is then dehydrated in a gaseous phase in the presence of a catalyst to obtain a mixture of 2,5-dimethyl-2,4-hexadiene and 2,5-dimethyl-1,5-hexadiene. Then 2,5-dimethyl-1,5-hexadiene in this mixture is isomerized to obtain 2,5-dimethyl-2,4-hexadiene. However, this process is so lengthy that the production cost is high.

Therefore an object of this invention is to provide a simple and economical method for producing 2,5-dimethyl-2,4-hexadiene.

We have found that when isobutylene and/or tertiary butanol and isobutyl aldehyde are reacted in a liquid phase under pressure and at a temperature of 110° to 200°C. in the presence of a catalyst, 2,5-dimethyl-2,4-hexadiene is obtained very easily in one step.

Thus the invention provides a process for producing 2,5-dimethyl-2,4-hexadiene, which comprises reacting isobutylene and/or tertiary butanol and isobutyl aldehyde in a liquid phase under pressure and at a temperature of 110° to 200°C. in the presence of a catalyst consisting of at least one catalyst selected from the group consisting of acids (e.g. mineral acids, sulfonic acids, heteropoly acids, etc.) and chlorides, sulfates and phosphates of metals and ammonia.

The process of the present invention may be illustrated as follows:

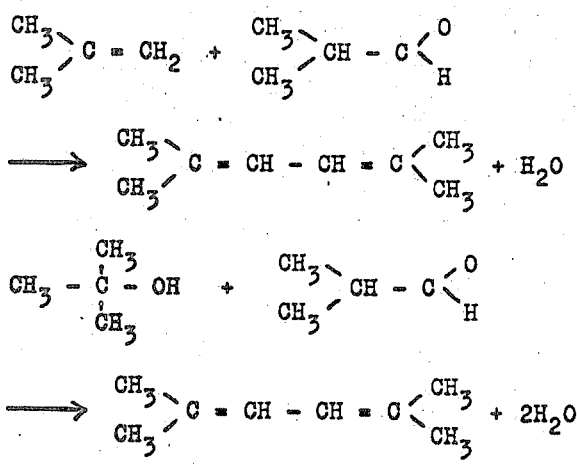

The starting materials to be used in the process of the present invention are isobutylene or tertiary butanol and isobutyl aldehyde. The purity of isobutylene is not critical. Thus isobutylene high in purity may be used, but it is also possible to use what is obtaned as a so-called spent B—B fraction. Further, it is possible to use isobutylene as diluted with an inert substance. Similarly the purity of tertiary butanol is not critical. If desired, it is also possible to use a mixture of isobutylene and tertiary butanol. In such case, the proportions of isobutylene and tertiary butanol are not critical. The purity of isobutyl aldehyde is also not critical.

The ratio of isobutylene or tertiary butanol or a mixture of isobutylene and tertiary butanol to isobutyl aldehyde is not critical. However, a molar ratio of isobutylene or tertiary butanol or a mixture of isobutylene and tertiary butanol to isobutyl aldehyde in a range of 1 to 10 is preferable.

The catalyst to be used in the present invention is selected from mineral acids, sulfonic acids, heteropoly acids, and chlorides, sulfates, phosphates of metals or ammonia, Particularly sulfuric acid, hydrochloric acid, phosphoric acid, toluenesulfonic acid, benzenesulfonic acid, and chlorides, sulfates and phosphates of aluminum, iron, chromium, tin, antimony, mercury, bismuth and cerium are preferable. Among them, sulfuric acid, hydrochloric acid, toluenesulfonic acid, and chlorides and sulfates of aluminum, iron, chromium, tin, antimony, bismuth and cerium are most preferable. Such catalyst may be used alone or as a mixture of two or more.

The catalyst may be added to the reaction system in any suitable manner. However, if it is a soluble one it is convenient to use the same as an aqueous solution. The catalyst dissolved in the aqueous layer after the reaction may be separated and repeatedly used as such for the subsequent reaction.

The process of the present invention is carried out under a pressure in a liquid phase. The required pressure is determined depending on the composition of the reaction liquid and the reaction temperature.

Generally the reaction is conducted at a temperature of 110° to 200°C. When the reaction temperature becomes higher than 210°C., the production of high boiling point substance such as a polymer will become noticeable and the reaction liquid will be colored to brown. When the reaction temperature is lower than 100°C., the reaction velocity will become very low, the condensing reaction of isobutyl aldehydes themselves will proceed first and the yield of 2,5-dimethyl-2,4-hexadiene will be reduced. Therefore, for the reaction temperature, a range of 110° to 200°C. is preferable and a range of 130°to 180°C. is optimum.

When the reaction product thus obtained is cooled to such extent that isobutylene does not evaporate, it will be separated into an oil layer and aqueous layer. The oil layer is separated and 2,5-dimethyl-2,4-hexadiene can be obtained therefrom by such usual method as distillation. The aqueous layer in which the catalyst is dissolved may be reused by circulating to the reaction system. The reaction may be conducted batchwise or continuously.

The above mentioned oil layer contains not only the objective product (2,5-dimethyl-2,4-hexadiene) but also many by-products. The main by-productss are low boiling point substances such as diisobutylene aznd2,2,5,5-tetramethyl tetrahydrofuran and high boiling point substances such as 2,2,5,5-tetramethyl-6-isopropyl-5,6-dihydropyran, 2,2,5,5-tetramethyl-6-isopropyl-4-hydroxy-3,4,5,6-tetrahydropyran and others. The oil layer may be distilled stepwise to first obtain a component of a boiling point lower than that of 2,5-dimethyl-2,4-hexadiene, secondly to obtain 2,5-dimethyl-2,4-hexadiene and further to obtain other high boiling point substances.

We have further found that when tetrametehyl tetrahydrofuran (which will be referred to as TMF hereinafter) distilled away from the oil layer as a component of a boiling point lower than that of 2,5-dimethyl-2,4-hexadiene is circulated and fed into the reaction system, the yield of 2,5-dimethyl-2,4-hexadiene is greatly increased.

Thus when the TMF is circulated and fed as such to the above reaction system for producing 2,5-dimethyl-2,4-hexadiene, 2,5-dimethyl-1,3-hexadiene which is an isomer will not be produced, and the TMF will be easily dehydrated to 2,5-dimethyl-2,4-hexediene so that the total yield of 2,5-dimethyl-2,4-hexadiene from isobutylene and/or tertiary butanol and isobutyl aldehyde is greatly increased. It is possible to obtain 2,5-dimethyl-2,4-hexadiene by reacting only TMF under a pressure in a liquid phase at a temperature of about 100° to 230°C, in the pressence of the above mentioned catalyst. However, the dehydrating reaction of TMF is an equilibrating reaction as shown by the following formula, and therefore it is difficult therein to elevate the conversion rate to higher than the equilibrium conversion rate. Therefore, the dehydration of TMF for the production of 2,5-dimethyl-2,4-hexadiene is not always advantageous:

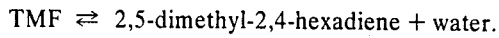

TMF ⇌ 2,5-dimethyl-2,4-hexadiene + water.

For example, 2 g. of a liquid mixture of 45% by weight TMF and 55% by weight diisobutylene, and 1 g. of an aqueous solution of 15% by weight sulfuric acid were put into a sealed glass tube of a capacity of 8 ml. (inside diameter of 7.5 mm.), and the tube was placed into a protective tube made of aluminum, and the reaction was allowed to occur by rotating the reactor assembly in an oil bath kept at 170°, 180° and 200°C. After the reaction, the sealed tube was cooled to 0°C. and opened to take out the reaction product, which was analyzed with gas chromatography. The TMF conversion and yield of 2,5-dimethyl-2,4-hexadiene (which may sometimes be referred to as 2,5-DM-2,4-HD hereinafter) at respective reaction temperatures for respective reaction times are shown in the following Table.

tion product by an ordinary method such as distillation may also be used as such.

When the oil layer is subjected to distillation to separate 2,5-DM-2,4-HD as explained hereinbefore, a considerably large amount of a bottom residue remains in the distilling column.

We have found that such bottom residue can be converted, upon thermal decomposition, into useful substances such as 2,5-dimethyl-2,4-hexadiene, 2,5-dimethyl-1,3-hexadiene, isobutyl aldehyde, etc.

Thus the said bottom residue contains 2,2,5,5-tetramethyl-6-isopropyl-5,6-dihydropyran, 2,2,5,5-tetramethyl-6-isopropyl-4-hydroxy-3,4,5,6-tetrahydropyran, and others which are not identified but form useful substances when decomposed. These components will produce isobutyl aldehyde, 2,5-dimethyl-1,3-hexadiene and 2,5-dimethyl-2,4-hexadiene when they are thermally decomposed. Among these decomposition products, isobutyl aldehyde can be circulated to the above mentioned liquid phase reaction system. Further, 2,5-dimethyl-1,3-hexadiene will be easily converted to 2,5-dimethyl-2,4-hexadiene when treated by using such catalyst as p-toluenesulfonic acid. Therefore, these decomposition products are substances useful for the production of 2,5-dimethyl-2,4-hexadiene so that, when they are effectively utilized, the production cost of 2,5-dimethyl-2,4-hexadiene may be remarkably reduced.

The above thermal decomposition can be effected in the presence of a dehydrating catalyst. For the catalyst, there can be effectively used such dehydrating catalyst as silica gel, active alumina, titanium oxide, silica alumina, synthetic zeolite, silica magnesia, silica zirconia, titanium phosphate, zirconia phosphate, cerium phosphate or a phosphate an a carrier.

The thermal decomposition may proceed at a temperature above 200°C., but a temperature in the range of 250° to 500°C. is most preferable. In case the decomposition temperature is lower than 250°C., the rate of evaporation of the heavy residue will be low so that it will be difficult to industrially carry out the decomposi-

| Reaction temperature (°C.) | Conversion (% by weight) Yield (% by weight) | Reaction time (min.) | | | | |
|---|---|---|---|---|---|---|
| | | 30 | 60 | 120 | 180 | 240 |
| 170 | TMF conversion | — | 33 | 49.5 | 57 | 60 |
| | Yield of 2,5-DM-2,4-HD | — | 32.5 | 48.5 | 56 | 58 |
| 180 | TMF conversion | — | 53 | 66 | 68 | 69 |
| | Yield of 2,5-DM-2,4-HD | — | 52 | 63 | 64 | 64.5 |
| 200 | TMF conversion | 66 | 77 | 80 | — | 81.5 |
| | Yield of 2,5-DM-2,4-HD | 64 | 70 | 67 | — | 60 |

Therefore, it is more advantageous to convert TMF to 2,5-dimethyl-2,4-hexadiene by circulating and feeding the same to the above mentioned reaction system rather than by treating the same alone for the dehydration.

The purity of TMF to be circulated and fed to the reaction system is not critical. Even when TMF of a low purity in which such by-product as diisobutylene is present is used there is no adverse influence on the yield and quality of 2,5-dimethyl-2,4-hexadiene. Further, TMF separated from the above mentioned reaction. On the contrary, when the temperature is higher than 500°C., the redecomposition of the decomposition products will be remarkable so that the yield will be considerably reduced.

The pressure under which the decomposition is conducted is not critical. Thus the reaction can be carried out under normal or atmospheric pressure, increased pressure or reduced pressure. However, from the indsutrial viewpoint, it is preferable to carry out the decomposition reaction under normal or atmospheric pressure.

In carrying out the decomposition reaction, only the bottom residue to be treated may be passed through the catalyst layer or the bottom residue may be diluted with nitrogen or steam before being passed through the catalyst layer.

The space velocity, that is, the volume of the raw material gas to be treated per hour per unit catalyst volume may be 100 to 2000, preferably 200 to 1000.

After the decomposition reaction, carbon and hydrocarbon will be deposited on the catalyst used. However the catalyst can be easily regenerated by heating the same in the presence of air, an oxygen-containing gas or steam at a high temperature.

TMF to be obtained as a component of a boiling point lower than that of 2,5-dimethyl-2,4-hexadiene can be also converted to 2,5-dimethyl-2,4-hexadiene by being catalytically decomposed in a gaseous phase by the same method as for the above mentioned heavy residue. However, 2,5-dimethyl-1,3hexadiene which is an isomer of 2,5-dimethyl-2,4-hexadiene will be simultaneously produced in a considerable amount. Therefore, in order to obtain 2,5-dimethyl-2,4-hexadiene at a high yield, it is necessary to further isomerize the produced 2,5-dimethyl-1,3-hexadiene and therefore this method will not be economical.

The heavy bottom residue, if desired, can be decomposed at a temperature of 250° to 500°C. as such or after a small amount of the catalyst component is included therein.

The catalyst to be used in such case is an organic sulfonic acid such as ethanesulfonic acid, benzenesulfonic acid or p-toluenesulfonic acid, chlorosulfonic acid, thionyl chloride, sulfur dioxide, sulfur trioxide or a boron trifluoride complex. The concentration of the catalyst is not more than 5.0% by weight, preferably not more than about 1.0% by weight. Even if the amount of the catalyst mixed in the residue is larger beyond this range, the effect will not be correspondingly increased so that such is uneconomical. Generally it is 0.01 to 5.0% by weight or particularly about 0.05 to 1.0% by weight. The decomposition reaction in this case proceeds at a temperature above 200°C., but a temperature in a range of 250° to 500°C. is most preferable. When the temperature is lower than 250°C., the rate of evaporation and reaction of the heavy residue is low. On the contrary, when the temperature is higher than 500°C., the redecomposition of the decomposition product is remarkable so that the yield will be reduced. The decomposition reaction pressure is not critical. Thus the reaction can be carried out under normal or atmospheric pressure, increased pressure or reduced pressure. However, from the industrial viewpoint, it is preferable to carry out the reaction under the normal pressure. It is convenient to carry out the reaction by diluting the residue with an inert gas such as nitrogen or carbon dioxide. The reaction tube may be hollow or may be filled with an inert solid carrier such as glass beads or silica gel.

The heavy bottom residue can also be decomposed in a liquid phase. The catalyst to be used for the liquid phase reaction is a mineral acid such as sulfuric acid, phosphoric acid or hydrochloric acid, an aliphatic or aromatic sulfonic acid, boron trifluoride complex such as boron trifluoride ethereat or boron trifluoride methylate, metallic sulfate such as bismuth sulfate, ceric sulfate or ferric sulfate, metallic chloride such as stannous chloride, ferric chloride, aluminum chloride or antimony chloride or heteropoly acid such as phosphotungstic acid or silicotungstic acid. The concentration of the catalyst is 0.05 to 5.0% by weight, preferably about 0.2 to 2.0% by weight. When the amount of the catalyst is below this range, the rate of decomposition will be low. However, even if the amount is above this range, the effect will not be correspondingly increased so that such will be uneconomical. The reaction may proceed at a temperature above 120°C., but a temperature in a range of 150°to 250°C. is most preferable. In case the liquid phase decomposition reaction temperature is lower than 150°C., the distilling velocity of the decomposition product will be low so that the time of contact of the decomposition product with the catalyst will become longer with a result that a secondary reaction will be caused and the yield will accordingly be reduced. When the temperature is higher than 250°C., the decomposition product will be likely to be condensed and polymerized so that the yield will be remarkably reduced.

The reaction pressure is not critical. Thus the reaction can be carried out under normal or atmospheric pressure, increased or reduced pressure.

In the liquid phase reaction, in order to inhibit the secondary reaction of the decomposition product, it is preferable to blow an inert gas such as nitrogen into the decomposition reaction solution so that the decomposition product may be taken out together with the inert gas.

In such thermal decomposition reaction of the heavy bottom residue, a pyran is contained in the decomposition product but this can be decomposed by being recirculated to the decomposition reaction system after it is separated.

Thus, according to the present invention, 2,5-dimethyl-2,4-hexadiene is produced by reacting isobutylene and/or tertiary butanol with isobutyl aldehyde under a pressure in a liquid phase at a temperature of 110° to 200°C. in the presence of at least one catalyst selected from mineral acids, sulfonic acids, heteropoly acids and chlorides, sulfates and phosphates of metals and ammonia. The reaction product is cooled and is then separated into an oil layer and aqueous layer, and the oil layer is successively distilled to obtain 2,5-dimethyl-2,4-hexadiene. The TMF obtained as a component of a boiling point lower than of 2,5-dimethyl-2,4-hexadiene in the course of the distillation of the oil layer is circulated to the reaction system and is decomposed under the reaction conditions to 2,5-dimethyl-2,4-hexadiene. At the same time, the higher boiling point component is decomposed in a gas phase or liquid phase in the presence of a dehydrating catalyst or acidic catalyst into 2,5-dimethyl-2,4-hexadiene and other useful substances which can be reused. Thus the by-product can be effectively decomposed into useful substances and therefore it is possible to produce 2,5-dimethyl-2,4-hexadiene at a high yield.

The present invention shall be more concretely explained with reference to the following examples. However, the invention is not limited to these examples. In these examples all percentages are by weight unless otherwise specified.

EXAMPLE 1

60 g. of isobutyl aldehyde, 185 g. of tertiary butanol and 35 g. of 16% (by weight) aqueous solution of sulfuric acid as a catalyst were charged into a glass-lined autoclave of a capacity of 1000 c.c. provided with a stirrer. Then the autoclave was put into an electric furnace and the stirring of the content was started. The content was heated to 160°C. within 30 minutes while being stirred. At 160°C., the mixture was made to react for 120 minutes. After the reaction, the autoclave was taken out of the electric furnace and was air-cooled to the room temperature. At the room temperature, low boiling point component such as isobutylene was taken out as a gas, dissolved in methanol cooled in dry ice-methanol and was collected. Then the autoclave was put into ice water and was cooled to 0° to 5°C. The oil layer and aqueous layer in the autoclave were taken out and were put together with the above mentioned methanol solution to make a uniform solution and then the solution was analyzed with a gas chromatography. The yield of 2,5-dimethyl-2,4-hexadiene was 35% by mols on the isobutyl aldehyde ujsed. The oil layer after the reaction was light yellow and, in the by-product, 2,2,5,5-tetramethyl tetrahydrofuran convertible to 2,5-dimethyl-2,4-hexadiene has been produced by 13% by mols on the isobutyl aldehyde used.

EXAMPLE 2

60 g. of isobutyl aldehyde, 105 g. of tertiary butanol, 154 g. of isobutylene and 75 g. of a 5% aqueous solution of sulfuric acid as a catalyst were charged into a glass-lined autoclave of a capacity of 1000 c.c. provided with a stirrer. Then, the autoclave was put into an electric furnace and the stirring of the content was started. The content was heated to 170°C. within 30 minutes while being stirred. At 170°C., the mixture was made to react for 120 minutes. After the reaction, the autoclave was taken out of the electric furnace and was air-cooled to the room temperature. At the room temperature, low boiling point component such as unreacted isobutylene was taken out as a gas, dissolved in methanol cooled in dry ice-methanol and was collected. Then the autoclave was put into ice water and was cooled to 0° to 5°C. The oil layer and aqueous layer in the autoclave were taken out and were put together with the above mentioned methanol solution to make a uniform solution and then the solution was analyzed with a gas chromatography. The yield of 2,5-dimethyl-2,4-hexadiene was 36% by mols on the isobutyl aldehyde used. The oil layer after the reaction was somewhat light yellow and, in the by-product, 2,2,5,5-tetramethyl tetrahydrofuran convertible to 2,5-dimethyl-2,4-hexadiene had been produced by 14% by mols on the isobutyl aldehyde used.

EXAMPLE 3

60 g. of isobutyl aldehyde, 140 g. of isobutylene and 35 g. of a 13% aqueous solution of sulfuric acid as a catalyst were put into a glass-lined autoclave of a capacity of 1000 c.c. provided with a stirrer. Then, the autoclave was put into an electric furnace and the stirring of the content was started. The content was heated to 160°C. within 30 minutes while being stirred. At 160°C., the mixture was made to react for 120 minutes. After the reaction, the autoclave was taken out of the electric furnace and was air-cooled to the room temperature. At the room temperature, lower boiling pont component such as unreacted isobutylene was taken out as a gas, dissolved in methanol cooled in dry-ice-methanol and was collected. Then the autoclave was put into ice water and was cooled to 0° to 5°C. The oil layer and aqueous layer in the autoclave were taken out and were put together with the above mentioned methanol solution to make a uniform solution and then the solution was analyzed with a gas chromatography. The yield of 2,5-dimethyl-2,4-hexadiene was 30% by mols on the isobutyl aldehyde used. The oil layer after the reaction was somewhat yellow and, in the by-product, 2,2,5,5-tetramethyl tetrahydrofuran convertible to 2,5-dimethyl-2,4-hexadiene had been produced by 11% by mols on the isobutyl aldehyde used.

EXAMPLE 4

60 g. of isobutyl aldehyde, 185 g. of tertiary butanol and 57 g. of a 47% aqueous solution of ferric chloride as a catalyst were charged into a glass-lined autoclave of a capacity of 1000 c.c. provided with a stirrer. Then, the autoclave was put into an electric furnace and the stirring of the content was started. The content was heated to 170°C. within 30 minutes while being stirred. At 170°C., the mixture was made to react for 180 minutes. After the reaction, the autoclave was taken out of the electric furnace and was air-cooled to the room temperature. At the room temperature, lower boiling point component such as isobutylene was taken out as a gas, dissolved in methanol cooled in dry ice-methanol and was collected. Then the autoclave was put into ice water and was cooled to 0° to 5°C. The oil layer and aqueous layer in the autoclave were taken out and were put together with the above mentioned methanol solution to make a uniform solution and then the solution was analyzed with a gas chromatography. The yield of 2,5-dimethyl-2,4-hexadiene was 40% by mols on the isobutyl aldehyde used. The oil layer after the reaction was somewhat yellow and, in the by-product, 2,2,5,5-tetramethyl tetrahydrofuran convertible to 2,5-dimethyl-2,4-hexadiene had been produced by 13% by mols on the isobutyl aldehyde used.

EXAMPLES 5 to 28

A mixture of isobutyl aldehyde, tertiary butanol and water at a mol ratio of 1:5:5 and each of catalysts shown in Table I were put into a sealed glass tube of a diameter of 5 mm. and a height of 190 mm. Then the sealed tube was put into a protective tube made of aluminum and was dipped in a heated oil bath while being rotated to make the mixture react at 170°C. After the reaction, the sealed tube was immediately taken out of the oil bath, was cooled with ice water and was then cooled with dry ice-methanol at −10 to −15°C. Then, the sealed tube was cut, and methanol in volume about 2 times as large as of the reaction solution was added to the reaction solution so that the oil layer and aqueous layer were made a uniform solution and the solution was analyzed with a gas chromatography. The results are indicated in Table I.

Table I

| Example No. | Catalyst | Amount of catalyst (% by weight) | Reaction time (min.) | Yield* (% by mols) |
|---|---|---|---|---|
| 5 | Sulfuric acid | 1.0 | 90 | 32 |
| 6 | Hydrochloric acid | 1.8 | 90 | 34 |
| 7 | Toluenesulfonic acid | 3.0 | 120 | 33 |
| 8 | Tungstic acid | 10 | 180 | 4.8 |
| 9 | Phosphomolybdic acid | 10 | 180 | 21 |
| 10 | Phosphotungstic acid | 10 | 180 | 20 |
| 11 | Silicotungstic acid | 10 | 180 | 24 |

Table I-Continued

| Example No. | Catalyst | Amount of catalyst (% by weight) | Reaction time (min.) | Yield* (% by mols) |
|---|---|---|---|---|
| 12 | Calcium hydrogen phosphate | 10 | 180 | 8.0 |
| 13 | Mercury chloride | 10 | 60 | 19 |
| 14 | Aluminum chloride | 9 | 255 | 27 |
| 15 | Aluminum sulfate | 5 | 180 | 19 |
| 16 | Cerium sulfate | 5 | 120 | 24 |
| 17 | Cerium phosphate | 10 | 180 | 6.9 |
| 18 | Stannons chloride | 10 | 60 | 27 |
| 19 | Stannons sulfate | 10 | 180 | 16 |
| 20 | Antimony chloride | 6 | 60 | 27 |
| 21 | Bismuth chloride | 10 | 60 | 25 |
| 22 | Chromium chloride | 10 | 255 | 35 |
| 23 | Chromium sulfate | 10 | 180 | 10 |
| 24 | Chromium phosphate | 10 | 180 | 3.3 |
| 25 | Ferric chloride | 10 | 180 | 37 |
| 26 | Ferric sulfate | 10 | 180 | 28 |
| 27 | Palladium chloride | 10 | 180 | 17 |
| 28 | Ammonium hydrogen sulfate | 5 | 180 | 16 |

* Yield: Yield (% by mols) of 2,5-dimethyl-2,4-hexadiene on the isobutyl aldehyde used.

EXAMPLE 29

60 g. of isobutyl aldehyde, 15 g. of tertiary butanol, 130 g. of isobutylene, 35 g. of a 15% aqueous solution of sulfuric acid and each of the amounts shown in Table II of TMF (fractionating temperature of 113° to 114°C.) or a mixture (fractionating temperature of 106° to 114°C.) of TMF and diisobutylene obtain by the distillation of the reaction product were put into an autoclave of a capacity of 1000 c.c. lined with glass and provided with a stirrer. Then tha autoclave was put into an electric furnace and the content was heated to 160°C. within 30 minutes while being stirred and was made to react at 160°C. for 180 minutes.

After the reaction, the autoclave was taken out of the electric furnace and was cooled to the room temperature. At the room temperature, lower boiling point component such as unreacted isobutylene was taken out as a gas and was condensed and collected in a coolant. Then the autoclave was put into ice water and was cooled to 0° to 5°C. The oil layer and aqueous layer in the autoclave were taken out and the respective layers were analyzed with a gas chromatography. The rate of conversion of isobutyl aldehyde, the yield of 2,5-DM-2,4-HD and the amount of TMF after the reaction on each of the amounts of addition of TMF were as shown in Table II.

EXAMPLE 30

60 g. of isobutyl aldehyde, 15 g. of tertiary butanol, 130 g. of isobutylene, 50 g. of a 47% aqueous solution of ferric chloride and each of the amounts shown in Table III of TMF (fractionating temperature of 113° to 114°C.) or a mixture (fractionating temperature of 106° to 114°C.) of TMF and diisobutylene obtained by the distillation of the reaction product were put into an autoclave of a capacity of 1000 c.c. lined with glass and provided with a stirrer. Then the autoclave was put into an electric furnace and the content was heated to 170°C. within 30 minutes while being stirred, and the content was made to react at 170°C. for 180 minutes. After the reaction, the autoclave was taken out of the electric furnace and was cooled to the room temperature. At the room temperature lower boiling point component such as unreacted isobutylene was taken out as a gas and was condensed and collected in a coolant. Then the autoclave was put into ice water and was cooled to 0° to 5° C. The oil layer and water layer in the autoclave were taken out and the respective layers were analyzed with a gas chromatography. The rate of conversion of isobutyl aldehyde, the yield in % by mols of 2,5-DM-2,4-HD and the amount of TMF after the reaction on each of the amounts of addition of TMF were as in Table III.

Table II

| Amount of TMF (g.) | Purity of TMF (% by weight) | Rate of conversion of isobutyl aldehyde (% by weight) | Yield of 2,5-DM-2,4-HD (% by mols)* | Amount of TMF after the reaction (g.) |
|---|---|---|---|---|
| 0 |  | 96 | 36 | 15 |
| 13 | Not less than 99% | 96 | 41 | 21 |
| 21 | do. | 95 | 45 | 29 |
| 25 | do. | 94.5 | 47 | 31 |
| 25 | 80% (20% diisobutylene) | 94 | 47 | 30 |

* The yield in % by mols of 2,5-DM-2,4-HD is on the basis of the isobutyl aldehyde (also hereinafter).

Table III

| Amount of TMF (g.) | Purity of TMF (% by weight) | Rate of conversion of isobutyl aldehyde (% by weight) | Yield of 2,5-DM-2,4-HD (% by mols) | Amount of TMF after the reaction (g.) |
|---|---|---|---|---|
| 0 |  | 90 | 40 | 17 |
| 15 | Not less than 99 % | 89.5 | 46 | 22 |
| 27 | Not less than 99 % | 89.5 | 51 | 32 |
| 27 | 80 % (20 % diisobutylene) | 89 | 50 | 33 |

EXAMPLE 31

Isobutylene and isobutyl aldehyde were made to react at 160°C. under pressure in the presence of an aqueous solution of sulfuric acid. After the reaction, the organic layer (oil layer) was taken out and was distilled to obtain 2,5-dimethyl-2,4-hexadiene and then the heavy bottom residue remaining in the distilling kettle was collected. The composition of the residue was as follows:

| | |
|---|---|
| 2,5-dimethyl-2,4-hexadiene: | 1.5 % by weight |
| 2,2,5,5-tetramethyl-6-isopropyl-5,6-dihydropyran: | 50.5 % by weight |
| 2,2,5,5-tetramethyl-6-isopropyl-4-hydroxy-3,4,5,6-tetrahydropyran: | 10.1 % by weight |
| Others: | 37.9 % by weight |

3.70 g./hr. of this heavy residue and 0.81 liter/hr. of nitrogen were fed together by an evaporator heated to 270°C., so that the heavy residue was gasified. The obtained gas was fed into a tubular reactor of an inside diameter of 12 mm. made of quartz and filled with 2.5 cc. of each of the catalysts indicated in Table IV and was made to react at 300°C. for 240 minutes. The product was condensed and was then analyzed by a gas chromatography. The results are as shown in Table IV.

EXAMPLE 32

Isobutylene and isobutyl aldehyde were made to react at 160°C. under a pressure in the presence of an aqueous solution of sulfuric acid. After the reaction, the organic layer (oil layer) was taken out and was distilled to obtain 2,5-dimethyl-2,4-hexadiene. Then the heavy bottom residue remaining in the distilling kettle was collected. The composition thereof was as follows:

| | |
|---|---|
| 2,5-dimethyl-2,4-hexadiene: | 0.5 % by weight |
| 2,2,5,5-tetramethyl-6-isopropyl-5,6-dihydropyran: | 55.8 % by weight |
| 2,2,5,5-tetramethyl-6-isopropyl-4-hydroxy-3,4,5,6-tetrahydropyran: | 21.7 % by weight |
| Others: | 22.0 % |

5.0 g./hr. of this heavy residue as such or as mixed with each of the catalysts shown in Table V and 1.92 liters/hr. of nitrogen were fed into a reaction tube of an inside diameter of 5.6 mm. and a length of 400 mm. made of quartz and heated to 375°C. so as to decompose the residue. The product flowing out of the reactor was condensed with a condenser and then the condensate was analyzed into respective components with a gas chromatography. The results were as shown in the following Table V:

Table IV

| Catalyst | Catalyst composition (% by weight) | Isobutyl aldehyde | Yield (% by weight) 2,5-dimethyl-1,3-hexadiene | 2,5-dimethyl-2,4-hexadiene |
|---|---|---|---|---|
| Silica gel | 100 % SiO$_2$ | 28.0 | 6.9 | 35.0 |
| MS-13X* | Na$_{86}$[(AlO$_2$)$_{86}$(SiO$_2$)$_{106}$]$_{276}$H$_2$O | 2.3 | 5.5 | 15.2 |
| Al$_2$O$_3$·B$_2$O$_3$ | 83 % Al$_2$O$_3$, 17 % B$_2$O$_3$ | 16.2 | 6.0 | 29.3 |
| SiO$_2$·ZrO | 88 % SiO$_2$, 12 % ZrO$_2$ | 8.5 | 5.8 | 16.4 |
| ZrP** | Zr : P = 1 : 1 (mol ratio) | 23.0 | 6.7 | 30.0 |
| TiP** | Ti : P = 1 : 2 ( do. ) | 2.7 | 6.3 | 23.7 |
| Silica alumina | 0.1 % Al$_2$O$_3$ | 19.6 | 5.6 | 30.0 |
| SiO$_2$·MgO | 67 % SiO$_2$, 33 % MgO | 14.8 | 5.6 | 19.6 |
| Solid phosphoric acid | Fommercial product | 4.3 | 9.3 | 0.5 |

* Molecular Sieve produced by Linde Co.
Prepared by adding phosphoric acid to a nitrate of zirconium or titanium so as to be of the composition (mol ratio) shown in Table IV and kneading and then firing the mixture.

Table V

| Catalyst | Catalyst concentration (% by weight) | Yield (% by weight) IBA | 1,3 HD | 2,4 HD | Recovery of pyran (% by weight) |
|---|---|---|---|---|---|
| None | 0 | 12.81 | 22.10 | 0.60 | 17.35 |
| P-toluenesulfonic acid | 0.20 | 18.92 | 19.34 | 13.00 | 24.68 |
| Benzenesulfonic acid | do. | 19.76 | 23.50 | 11.72 | 21.93 |
| Ethanesulfonic acid | do. | 16.39 | 24.65 | 2.59 | 15.65 |
| Sulfosalicylic acid | do. | 19.49 | 31.41 | 3.15 | 15.40 |
| SO$_3$ | 0.06 | 17.10 | 28.18 | 1.64 | 17.05 |
| SO$_2$Cl$_2$ | 0.20 | 14.96 | 26.15 | 1.22 | 16.47 |
| BF$_3$·CH$_3$OH | do. | 15.59 | 25.32 | 1.65 | 12.42 |

IBA : Isobutyl aldehyde
1,3 HD : 2,5-dimethyl-1,3-hexadiene
2,4 HD : 2,5-dimethyl-2,4-hexadiene Recovery of pyran = Pyran (g.) in the condensation produced solution/Heavy residue (g.) fed to the reaction system

EXAMPLE 33

50 ml. (43.0 g.) of a heavy residue of the same composition as of the heavy residue used in Example 32 were put into a flask of a capacity of 100 ml. provided with a stirrer, and 2.0% by weight of each of the below mentioned catalysts was mixed therein. Then nitrogen was fed as bubbled at a rate of 50 c.c./min. into the mixture while being stirred and the flask was gradually dipped in an oil bath at 200°C. The reaction was continued for 1 hour while trapping the generated gas with an ice bath. After the reaction, the product in the trap was analyzed with a gas chromatograph to obtain the results in the below Table VI.

Table VI

| Catalyst | Yield (% by weight) | | | Recovery of pyran (% by weight) |
| --- | --- | --- | --- | --- |
| | IBA | 1,3 HD | 2,4 HD | |
| Sulfuric acid | 3.94 | 1.86 | 5.73 | 41.38 |
| P-toluenesulfonic acid | 9.40 | 1.60 | 16.20 | 24.20 |
| $H_3PO_4$ | 4.96 | 1.03 | 5.83 | 10.19 |
| $BF_3 \cdot CH_3OH$ | 4.77 | 2.56 | 7.29 | 24.73 |
| $SnCl_2$ | 2.67 | 1.27 | 2.99 | 49.84 |
| $Fe_2(SO_4)_3$ | 3.10 | 1.36 | 4.92 | 41.74 |
| Phosphotungstic acid | 4.95 | 0.67 | 3.51 | 36.78 |

Since the reaction medium is very corrosive it is preferable to use lead or its alloy, more preferably antimonial lead, as the material for the construction of equipments for the production of 2,5-dimethyl-2,4-hexadiene according to this invention.

What we claim is:

1. A process for producing 2,5-dimethyl-2,4-hexadiene which comprises reacting at least one member selected from the group consisting of isobutylene and tertiary butanol with isobutyl aldehyde under pressure in a liquid phase at a temperature of 130–180°C in the presence of at least one catalyst selected from the group consisting of mineral acids, sulfonic acids, heteropoly acids and chlorides, sulfates and phosphates of metals and ammonia, at a molar ratio of isobutylene, tertiary butanol or mixture thereof to isobutyl aldehyde of 1–10, cooling the reaction product, separating the oil layer which has formed and successively distilling the oil layer to obtain 2,2,5,5-tetramethyl tetrahydrofuran and 2,5-dimethyl-2,4-hexadiene as separate fractions of the distillation, and incorporating the fraction of 2,2,5,5-tetramethyl tetrahydrofuran into the mixture of isobutyl aldehyde and at least one member selected from the group consisting of isobutylene and tertiary butanol.

2. A process for producing 2,5-dimethyl-2,4-hexadiene according to claim 1, wherein said catalyst is sulfuric acid, hydrochloric acid, toluenesulfonic acid, or a chloride or a sulfate or aluminum, iron, chromium, tin, antimony, bismuth or cerium.

3. A process for producing 2,5-dimethyl-2,4-hexadiene according to claim 1, wherein the heavy bottom residue remaining as a component of a boiling point higher than of 2,5-dimethyl-2,4-hexadiene after the distillation of the oil layer is decomposed in a gaseous phase at a temperature of 250° to 500°C. in the presence of dehydrating catalyst.

4. A process according to claim 1, wherein the said dehydrating catalyst is silica gel, active alumina, titanium oxide, silica alumina, synthetic zeolite, silica magnesia, silicate zirconia, titanium phosphate, zirconia phosphate, cerium phosphate or a phosphate on a carrier.

5. A process for producing 2,5-dimethyl-2,4-hexadiene according to claim 1, wherein the heavy residue obtained as a component of a boiling point higher than of 2,5-dimethyl-2,4-hexadiene after the distillation of the oil layer is decomposed in a gaseous phase at 250° to 500°C. as such or in the presence of a small amount of at least one catalyst selected from organic sulfonic acids, chlorosulfonic acid, thionyl chloride, sulfur dioxide, sulfur trioxide and boron trifluoride complexes.

6. A process according to claim 5, wherein the said catalyst is employed in an amount of from 0.01 to 5.0% by weight.

7. A process for producing 2,5-dimethyl-2,4-hexadiene according to claim 1, wherein the heavy residue obtained as a component of a boiling point higher than of 2,5-dimethyl-2,4-hexadiene after the distillation of the oil layer is decomposed in a liquid phase at 150° to 250°C. in the presence of at least one catalyst selected from mineral acids, organic sulfonic acids, boron trifluoride complexes, metallic sulfates, metallic chlorides and heteropoly acids.

8. A process according to claim 7, wherein the concentration of the said catalyst is 0.05 to 5.0% by weight.

9. A process according to claim 7, wherein an inert gas is blown into the reaction medium.

10. A process according to claim 1, wherein the reaction is carried out in a reactor made of lead or its alloy.

* * * * *